(12) United States Patent
Xu

(10) Patent No.: US 11,783,374 B2
(45) Date of Patent: Oct. 10, 2023

(54) METHOD AND DEVICE FOR PROVIDING REAL-TIME DATA SERVICE

(71) Applicant: BOE TECHNOLOGY GROUP CO., LTD., Beijing (CN)

(72) Inventor: Lei Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 222 days.

(21) Appl. No.: 17/486,480

(22) Filed: Sep. 27, 2021

(65) Prior Publication Data

US 2022/0253904 A1 Aug. 11, 2022

(30) Foreign Application Priority Data

Feb. 5, 2021 (CN) .......................... 202110164799.8

(51) Int. Cl.
*G06Q 30/0251* (2023.01)
*G06F 16/22* (2019.01)
*G06F 16/25* (2019.01)
*G06Q 30/0201* (2023.01)

(52) U.S. Cl.
CPC ....... *G06Q 30/0269* (2013.01); *G06F 16/221* (2019.01); *G06F 16/2282* (2019.01); *G06F 16/252* (2019.01); *G06Q 30/0201* (2013.01)

(58) Field of Classification Search
CPC .............................................. G06Q 30/0269
USPC ....................................................... 707/791
See application file for complete search history.

(56) References Cited

U.S. PATENT DOCUMENTS

| 9,679,299 | B2 * | 6/2017 | Yoder ................ G06Q 30/0201 |
| 2001/0047372 | A1 * | 11/2001 | Gorelik .................... G06F 16/84 715/239 |
| 2008/0077368 | A1 * | 3/2008 | Nasle ..................... G05B 17/02 703/4 |
| 2010/0214545 | A1 * | 8/2010 | Funk .................. G03F 7/70466 430/30 |
| 2012/0170854 | A1 * | 7/2012 | Jain ........................ G06F 16/51 382/209 |
| 2019/0369984 | A1 * | 12/2019 | Malladi ............. H04L 12/40006 |

(Continued)

FOREIGN PATENT DOCUMENTS

| CN | 111008197 A | 4/2020 |
| CN | 111143465 A | 5/2020 |

*Primary Examiner* — Muluemebet Gurmu
(74) *Attorney, Agent, or Firm* — Myers Bigel, P.A.

(57) ABSTRACT

A method and device for providing real-time data service are disclosed. The method includes creating a message engine for receiving real-time data generated by a real-time data source, creating a data processing engine for acquiring the real-time data in the message engine and processing the real-time data to obtain target data, creating a storage engine for storing the target data and providing the target data according to requirement of a real-time data service, and containerizing the message engine, the data processing engine and the storage engine, and constructing a real-time data processing architecture with a containerized message engine, a containerized data processing engine and a containerized storage engine to provide the real-time data service. Embodiments of this disclosure can realize an overall architecture of real-time data reception, real-time data processing, real-time data storage, and real-time data service.

16 Claims, 9 Drawing Sheets

(56) References Cited

U.S. PATENT DOCUMENTS

2020/0344299 A1* 10/2020 Sohail .................... G06F 3/067
2021/0048995 A1* 2/2021 Myers ................ G06F 11/1451

* cited by examiner

```
{
    "event_type": "tag_push",
    "event_time": 1591337669,
    "location": "beijing",
    "from_system": "gitlab",
    "reporter": "system",
    "version": "v1.2.0",
    "arguments": [
        {
            "role": "Item Name",
            "argument":   "EPD_Transform"
        },
        {
            "role": "Item Note",
            "argument":   "EPD Smart Color Filtering"
        },
        {
            "role": "Item Address",
            "argument":   "git@************:aibd/image_process_group/EPD_Transform.git"
        },
        {
            "role": "Add File Number",
            "argument":   3
        },
        {
            "role": "Submit Note",
            "argument":   "Fix The Bug Of Slow Response"
        },
    ]
}
```

Fig.4

```
kafka:
  image: wurstmeister/kafka:2.12-2.1.0
  restart: always
  ports:
    - "9092:9092"
  environment:
    HOSTNAME_COMMAND: "route -n | awk '/UG[ \t]/{print $$2}'"
    KAFKA_CREATE_TOPICS: "zhyq-ab-data:3:1"
    KAFKA_ZOOKEEPER_CONNECT: zookeeper:2181
    KAFKA_LOG_DIRS: /opt/kafka/logdir
    TZ: Asia/Shanghai
    LC_ALL: C.UTF-8
    LANG: C.UTF-8
  depends_on:
    - zookeeper
  volumes:
    - /var/run/docker.sock:/var/run/docker.sock
    - ${KAFKA_DIR}/logdir:/opt/kafka/logdir
    - /etc/timezone:/etc/timezone
    - /etc/localtime:/etc/localtime
     networks:
     aliases:
       - kafka
```

Fig.6

METHOD AND DEVICE FOR PROVIDING REAL-TIME DATA SERVICE

RELATED APPLICATION

The present application claims the priority of Chinese patent application No. 202110164799.8 filed on Feb. 5, 2021, the entire disclosure of which is incorporated herein by reference.

FIELD

This disclosure relates to the technical field of real-time service, and specifically to a method and device for providing real-time data service and realizing real-time service.

BACKGROUND

Real-time service is a novel service concept established on the basis of frontier marketing theories such as customized marketing, experiential marketing and user relation management. The real-time service can respond to dynamic needs of a user rapidly and satisfy new needs of a customer during consumption at any time. The real-time service can improve user satisfaction, help to foster user loyalty and enhance product competitiveness, and exert profound influence on promoting product service quality.

However, existing real-time data service usually requires the use of a great number of devices to construct a complex architecture. Due to great construction difficulties and high construction costs, such an architecture can hardly be used on a large scale.

SUMMARY

It is an object of this disclosure to provide a method and device for providing real-time data service, which enables to construct a lightweight overall architecture to realize real-time data reception, real-time data processing, real-time data storage, and real-time data service in a cost-effective way.

In a first aspect, the embodiments of this disclosure comprise a method for providing real-time data service. The method comprises: creating a message engine for receiving real-time data generated by a real-time data source; creating a data processing engine for acquiring the real-time data in the message engine and processing the real-time data to obtain target data; creating a storage engine for storing the target data and providing the target data according to requirement of a real-time data service; and containerizing the message engine, the data processing engine and the storage engine, and constructing a real-time data processing architecture with a containerized message engine, a containerized data processing engine and a containerized storage engine to provide the real-time data service.

In a second aspect, the embodiments of this disclosure comprise a device for providing real-time data service. The device comprises: a message engine configured to receive real-time data generated by a real-time data source and store the real-time data; a data processing engine configured to acquire the real-time data in the message engine and process the real-time data to obtain target data; a storage engine configured to store the target data and provide the target data according to requirement of a real-time data service. The message engine, the data processing engine and the storage engine are containerized, and the containerized message engine, data processing engine and storage engine are used as components for constructing a real-time data processing architecture to provide the real-time data service.

In a third aspect, the embodiments of this disclosure comprise a computing device. The computing device comprises: a memory for storing a computer program; a processor for executing the computer program to implement steps of the method for providing real-time data service according to the embodiments of this disclosure.

In a fourth aspect, the embodiments of this disclosure comprise a non-transitory computer-readable storage medium. The computer-readable storage medium has a computer program stored thereon, and the computer program, when executed by a processor, causes the processor to implement steps of the method for providing real-time data service according to the embodiments of this disclosure.

BRIEF DESCRIPTION OF DRAWINGS

The embodiments of this disclosure will be described only by way of examples with reference to the drawings, in which:

FIG. 4 is a schematic view of a standard data format according to an embodiment of this disclosure.

FIG. 6 is a schematic view of an image configuration file according to an embodiment of this disclosure.

DETAILED DESCRIPTION OF EMBODIMENTS

In the following description, for explanatory purposes instead of limiting purposes, some specified details of the disclosed embodiments are stated so as to describe technical solutions in the embodiments of this disclosure in a clear and complete manner. However, those skilled in the art should understand that this disclosure can be implemented by further embodiments without deviating from the spirits and scopes of this disclosure obviously, and these further embodiments do not accurately satisfy the details herein.

Figure 1:
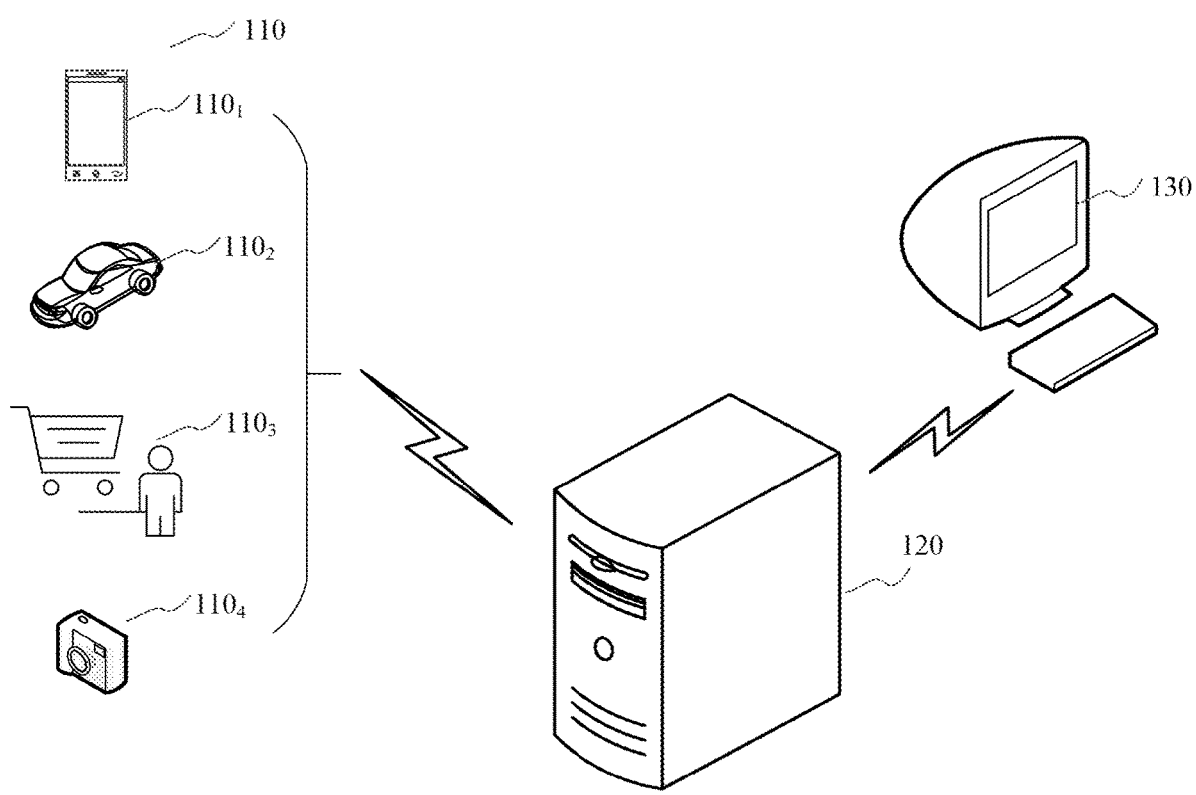
FIG. 1 is a schematic structure view of an environment for implementing the embodiments of this disclosure.

With reference to FIG. 1, a schematic view of an environment for implementing the embodiments of this disclosure is shown. The environment may be an environment in application scenarios such as smart parks, smart cities, smart education, smart banking, smart transportation, and smart office. As shown in FIG. 1, the environment may comprise a real-time data source 110, a server 120 and a real-time service terminal device 130.

The real-time data source 110 is configured to generate real-time data. The real-time data may be traffic data, service data and characteristic data. For example, the traffic data may be log data, the service data may be service binlog data, and the characteristic data may originate from a variety of sources. The teal-time data source may comprise a user terminal device, an Internet of Things (IoT) device and so on. The user terminal device may comprise, for example, desktop computers, laptop computers, tablet computers, mobile phones and other mobile devices, as well as wearable devices (for example, smart watches, smart glasses, headsets), etc. The IoT device may comprise any device capable of joining an Internet of Things (IoT) system or network and/or capable of communicating with it, for example, equipment and apparatuses associated with vehicles (such as navigation systems, autonomous driving systems, etc.), equipment, apparatuses and/or infrastructures associated with industrial manufacturing and production, etc. and various apparatuses in smart entertainment systems (such as televisions, audio systems, electronic game systems), smart home or office systems, security systems (such as monitoring systems) and e-commerce systems, etc. FIG. 1 exemplarily shows a mobile phone $110_1$, a vehicle $110_2$, a shopping cart $110_3$ and a camcorder $110_4$ that may serve as a real-time data source. It can be understood that the real-time data source according to the embodiments of this disclosure may have other forms and is not limited thereto.

The server 120 is configured to implement the real-time data processing solution according to the embodiments of this disclosure. The server 120 may be provided with a real-time data processing architecture to support the collection, processing, storage and use of real-time data. The server 120 may comprise a local server and a cloud server.

The real-time service terminal device 130 is configured to provide real-time data service to the user. The real-time service terminal device 130 may be a smart phone, a tablet computer, a laptop portable computer and a desktop computer, etc.

The server 120 may communicate with the real-time data source 110 and the real-time service terminal device 130 over a wireless or wired network. In some embodiments, the server 120 may generate target data, for example, calculate a real-time index or quasi real-time index, based on real-time data received from the real-time data source 110, such as binlog, event tracking log and backend service log etc., and transfer the target data to the real-time service terminal device 130 responsive to a real-time service request from the real-time service terminal device 130 so as to provide real-time data service to the user.

Figure 2:
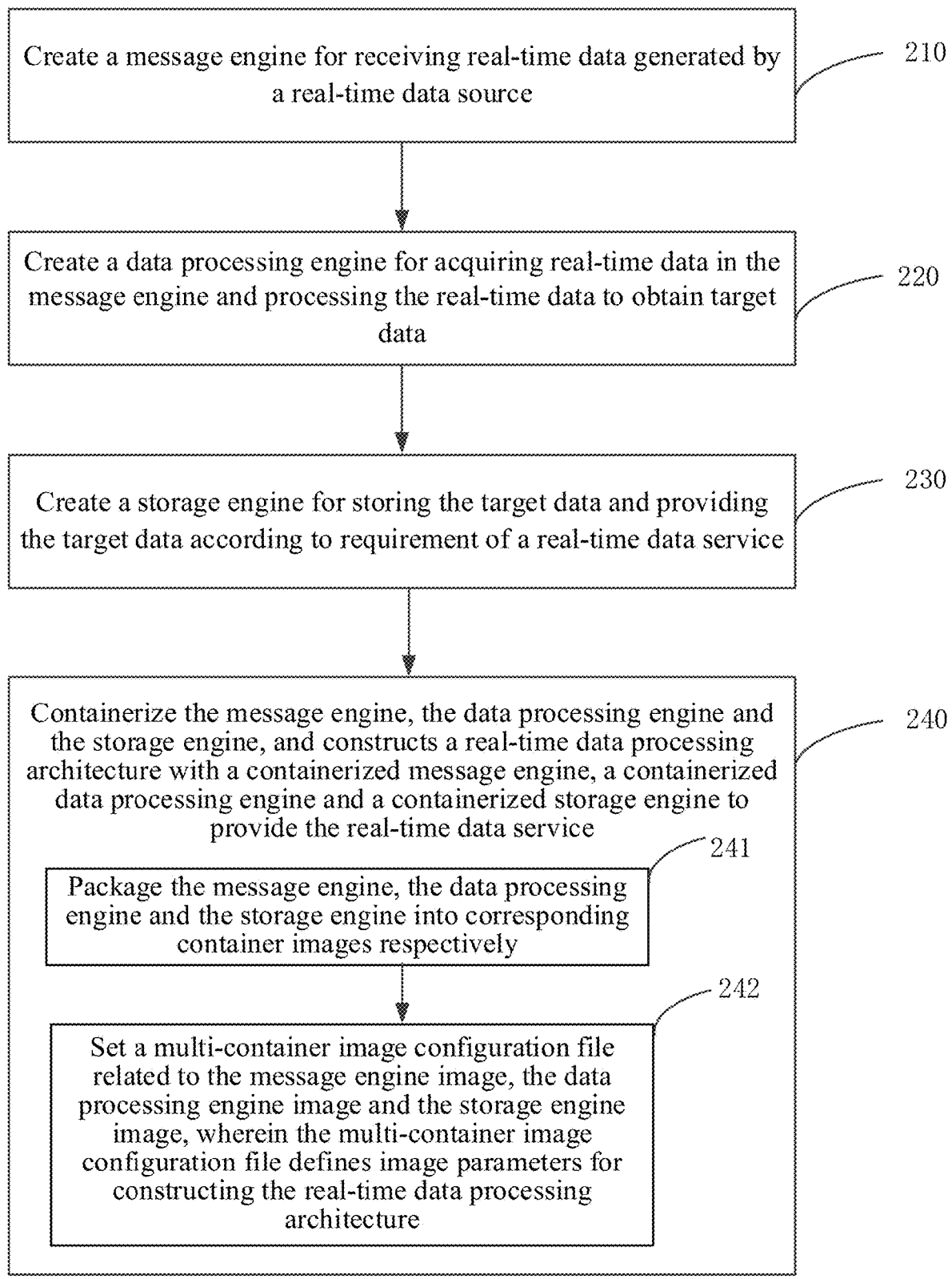
FIG. 2 is a flow chart of a method according to an embodiment of this disclosure.

FIG. 2 is a flow chart of a method for providing real-time data service according to an embodiment of this disclosure. The method may be implemented by a server or a cloud server to support the collection, processing, storage and use of real-time data. The method comprises steps of:

Step 210, creating a message engine for receiving real-time data generated by a real-time data source and storing the real-time data.

In some embodiments, the message engine may receive real-time data via a data receiving interface. The data receiving interface may collect and/or receive real-time data generated by a real-time data source. The data receiving interface may be an Application Programming Interface (API) satisfying Hyper Text Transfer Protocol over Secure Socket Layer (HTTPS) protocols. Optionally, the data receiving interface may be a reverse API interface, e.g., webhook. In case of a reverse API interface, a frontend does not actively send a request, and real-time information is completely pushed by a backend. For example, when a terminal or event tracking of a system generates data, they actively push the data distribution to the data receiving interface.

In some embodiments, the API interface security policy utilizes Advanced Encryption Standard (AES) symmetric encryption for security authentication.

Figure 3:
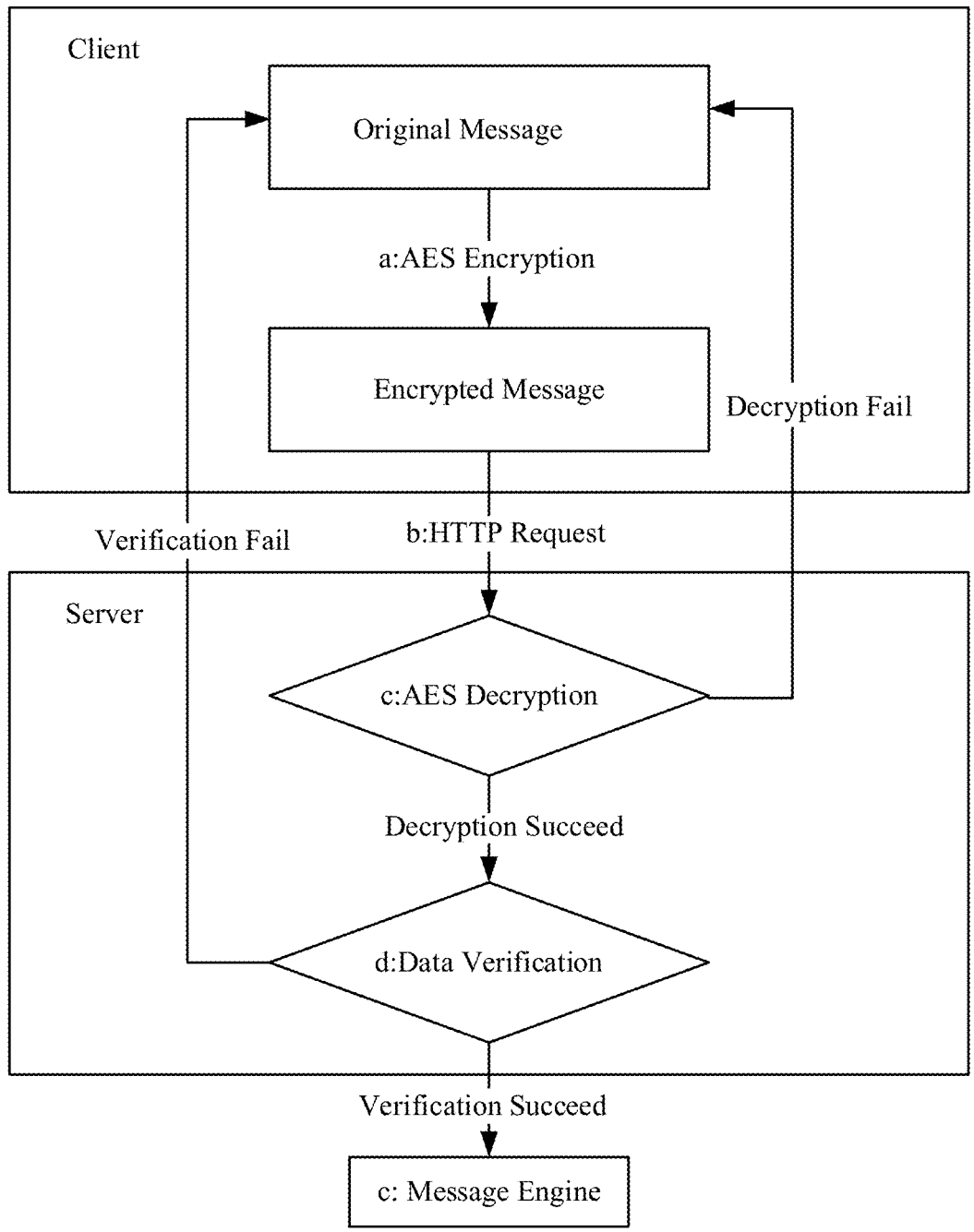
FIG. 3 is a flow chart of a security authentication method of a data receiving interface according to an embodiment of this disclosure.

FIG. 3 exemplarily shows a flow chart of a security authentication method of a data receiving interface. Given that the real-time data source acts as a client, and the data receiving interface acts as a server, the authentication method comprises:

Step a, the client performs AES encryption on an original message with a key issued by the server to obtain an encrypted message.

Step b, the client sends a HTTP request to the server in order to send the encrypted message to the server.

Step c, the server receives the encrypted message and performs AES decryption on the encrypted message. If the decryption fails, the encrypted message is discarded and the procedure returns to step a. If the decryption succeeds and decrypted data is obtained, the method proceeds to step d.

Step d, the decrypted data is verified. Exemplarily, it is possible to calculate a time difference between the client sending a HTTP request and the server responding to the HTTP request, and determine whether the time difference is greater than a preset threshold, e.g., 600 s. If the time difference is greater than the preset threshold, it is determined that the HTTP request sent by the client is an expired request, so the verification fails, and the corresponding decrypted data is discarded and the procedure returns to step a. If the time difference is smaller than the threshold, it is determined that the HTTP request sent by the client is a normal request, so the verification succeeds, and the corresponding decrypted data is stored in the message engine.

In some embodiments, the real-time data may comprise, but is not limited to, real-time data streams transferred by terminals over IoT platforms and real-time data streams collected through event tracking in software. Exemplarily, the IoT platforms may achieve reliable and low-latency data communication between the client and the server by using Message Queue Telemetry Transport (MQTT) protocols.

The real-time data may be encapsulated in a certain format, for example, the format may be defined as a semi-structured json format or xml message format, etc.

In some embodiments, the real-time data may have a standard data format. The standard data format includes data type and data content. The data type comprises but is not limited to json format or xml format.

FIG. 4 shows a schematic view of a standard data format according to an embodiment of this disclosure. As shown in FIG. 4, the real-time data having a standard data format may comprise but is not limited to content items of: event_type, event_time for indicating when the data is generated, location for indication where the data is generated, from_system for indication where the data originates, reporter, version and data detail information. The event_type may be customized according to service content. The data detail information comprises multiple pairs of tags (role and argument) and corresponding tag values. In one embodiment, when the data type is json format, the header of a request for transferring message is conent-type:application/json.

In some embodiments, a universal standard data format is defined for the real-time data such that the data receiving interface is of a universal type. Therefore, a single data receiving interface may be reused to collect and/or receive real-time data streams from different real-time data sources.

The message engine may comprise a distributed data stream processing platform, which can publish, subscribe, store and process data streams in real time. The message engine is designed to process data streams from multiple producers (e.g., real-time data sources), and deliver them to multiple consumers. Architecture of the message engine comprises the producers sending messages to the message engine and the consumers reading the messages from the message engine. A model of the message engine comprises a message queue model and a publishing/subscribing model.

In some embodiments, the message engine has a security authentication mechanism. For example, the security authentication mechanism comprises: it is required that a user name and password of a client sending data to and reading data from the message engine are registered in a configuration file of the message engine so that the message engine grants the user a corresponding right to read/write data.

The message engine may comprise multiple topics for classifying messages corresponding to (e.g., conveyed by) the real-time data. Each topic represents a type of messages, e.g., a message delivery location. A producer may convey messages by sending real-time data to the message engine. The real-time data may be partitioned into different partitions within different topics. In the partitions, the messages may be strictly sorted by their offsets (locations of the messages in the partitions).

In the publishing/subscribing model of the message engine, each producer can specify a topic to which the message is published. A consumer can subscribe topics and receive messages published to these topics. In some embodiments, a same topic may be subscribed by multiple consumers.

The data receiving interface may be regarded as a message producer for the message engine. In some embodiments, the message engine may require the received real-time data to satisfy a standard data format. Therefore, real-time data having the standard data format may be continuously transferred to a specified topic, i.e., real-time data having a same standard data format may be transferred to a same topic of the message engine. Optionally, real-time data having the same standard data format has an identical data type and identical data content, or an identical data type and partly identical data content.

In some application scenarios, for the message engine, a better data transfer effect is achieved by using fewer topics to transfer large volume data than using more topics to transfer small volume data. In such a scenario, a data receiving interface of a universal type may be used to minimize the number of topics set in the message engine. For example, one same topic may be set for data having one same standard format, thereby achieving an effect of optimizing the message engine.

In one embodiment, the message engine may be created by using Kafka. Kafka can realize real-time transmission of extremely large amounts of data because of its characteristics of high availability, persistent storage of data, high throughput, low latency, and scalability. Kafka may be used for realizing real-time transmission of real-time data between the data receiving interface and the data processing engine.

The message engine, e.g., Kafka, may be configured to support a cluster mode. In this mode, multiple copies of the same data may be backed up, so high system availability can be maintained by providing a redundancy mechanism collectively. Kafka may be further configured to store real-time data persistently. Persistent herein refers to storing data transferred to Kafka in a hard disc within a preset period of time, e.g., 7 days, without deleting it. Besides, since the number of messages, i.e., the number of pieces of data, that Kafka can process per second is large, it has high throughput. In Kafka, the time interval between the client initiating a request and the server processing the request and sending a response to the client is short, so it has low latency. Moreover, Kafka may be further configured to freely add a cluster(s) in the original cluster to expand the processing capacity of the cluster, so it is scalable.

Returning to FIG. 2, in step 220, a data processing engine is created for acquiring the real-time data in the message engine and processing the real-time data to obtain target data.

In some embodiments, the data acquired or received by the data processing engine is a real-time data stream in a specified topic of the message engine. The data stream may comprise a bounded data stream and an unbounded data stream. The bounded data stream means that the inputted data has both a start and an end. For example, in the application scenario of smart banking, the real-time data may be transaction data of one minute or one day. The bounded data stream may be processed in a manner of batch processing. Unbounded data stream means that the inputted data has no end but only a start, and once data generation is started, new data will be generated continuously, i.e., the data has no time boundary. The unbounded data stream needs to be processed continuously. For example, data in the topics of Kafka is generally an unbounded data stream.

In some embodiments, the data processing engine may serve as a consumer to consume the real-time data in the message engine that is produced by a producer.

Optionally, the data processing engine may serve as a consumer to read the real-time data in the message engine. The message engine may store an offset in a partition of the message read by each consumer, the offset indicating which message the consumer has consumed. By storing the offset, it may be ensured that no consumer will read repetitive messages, and every time a new message is read, the reading starts from the recorded offset.

Optionally, in a publishing/subscribing model of the message engine, when the data processing engine subscribes a specified topic in the message engine, as long as there is data unread/unprocessed by the data processing engine in the subscribed topic, the data processing engine will process the data in real time.

In some embodiments, the processing of real-time data by the data processing engine comprises at least one of:
    deleting real-time data not meeting a preset condition. For example, given that the real-time data is { }, i.e., empty json, the real-time data may be deleted. The preset condition may be defined depending on the data service involved.
    converting real-time data in nested format into one dimension format. For example, if there is real-time data in the following nested format:

```
{
"k1":"v1",
"k2":[
{
"k":"k3",
"v":"v3",
},
{
"k":"k4",
"v":"v4",
}
],
"k5":{
```

-continued

```
    "k6":"v6",
    "k7":"v7",
  }
}
``` then, based on this nested relation, the real-time data may be converted into data in one dimension format {"k1": "v1", "k3":"v3", "k4": "v4", "k5_k6":"v6", "k5_k7": "v7"}.

cleaning the real-time data. For example, if the name of a field existing in the real-time data conflicts with that of a reserved field in the storage engine, then renaming is required. For instance, if the name of a field in the real-time data is "from", the field "from" in the real-time data is required to be renamed since "from" is a reserved field in a general relational database. For example, this field may be renamed to be "_from" by adding a prefix thereto.

integrating the cleaned real-time data to obtain the target data. Optionally, the data processing engine may integrate the real-time data of multiple topics in a message engine or the real-time data from multiple different real-time data sources in one topic of the message engine. In a scenario of a smart park, the real-time data from multiple different real-time data sources includes an abnormal log, a normal log, an alarm log of each work site in the park, and real-time track data of personnel in the park. These real-time data are pushed to one same data receiving interface. The data receiving interface sends these data to one same topic of the message engine. Upon acquisition of these real-time data, the data processing engine may integrate them to obtain target data related to the park.

Exemplarily, the data processing engine may be created by using Flink. Flink is a framework and distributed processing engine for stateful computations over bounded and unbounded data streams. A Flink engine can achieve real-time data processing with high performance, high reliability and high scalability.

In step 230, a storage engine is created for storing the target data and providing the target data according to requirement of a real-time data service.

The real-time data may be stored in different storage engines based on different application scenarios in which the real-time data is collected. In some embodiments, the storage engine comprises a column-oriented database management system, also known as a column-based database, e.g., ClickHouse. The column-based database is a storage engine capable of utilizing an online analytical processing (OLAP) engine, which can support distributed deployment, featuring fast query speed, free compression algorithm selection and good high-compression effect, so it is suitable for supporting data service scenarios with high real-time requirements.

Figure 5:
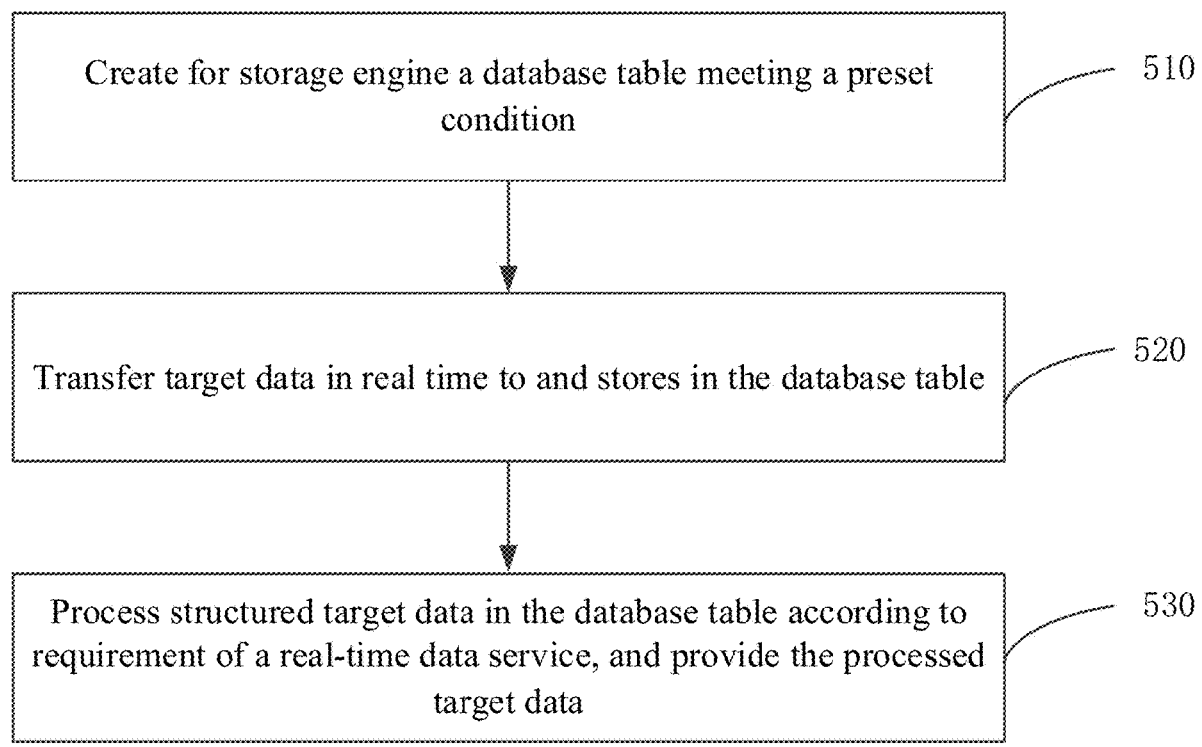
FIG. 5 is a flow chart of a method for storing target data into a storage engine according to an embodiment of this disclosure.

In some embodiments, the storage engine may be created by using ClickHouse. FIG. 5 shows a flow chart of a method for storing the target data in ClickHouse and providing the target data according to an embodiment of this disclosure. The method comprises:

Step 510, creating for the storage engine (e.g., ClickHouse) a database table meeting a preset condition. In some embodiments, the preset condition may be set depending on the application scenarios and it prescribes the storage requirements for the target data.

Step 520, transferring the target data in real time to and storing in the database table. Optionally, in a scenario in which the data processing engine is Flink, Flink may be connected to ClickHouse such that the target data is transferred to and stored in the database table of ClickHouse via Flink.

Step 530, optionally, in case that the real-time data service requires analysis processing of the data, ClickHouse may process structured target data in the database table according to the requirement of the real-time data service, and provide the processed target data for use with the real-time data service. Optionally, the processing may comprise operations like aggregation and/or filtering. The processed target data may comprise statistical data results.

In some embodiments, in order to keep the service usage data concise and easy to use, it may be desirable to use a column-based database, such as ClickHouse, as a data warehouse, and store the service usage data in a separate database in order to separate the service usage data from the data warehouse. In this way, the storage engine may comprise both a column-based database and a relational database, e.g., PostgreSQL and mysql.

The real-time data service may read the target data from the storage engine via a data invoking interface. The data invoking interface may be an API interface satisfying HTTPS protocol. The data input and output format on the data invoking interface may be a standard data format. For example, the data input and output format may be defined as a semi-structured json format. Correspondingly, the header of a request for transferring message is conent-type:application/json. In some embodiments, the API interface security policy utilizes AES symmetric encryption for security authentication. The authentication method of the data invoking interface is roughly the same as that of the data receiving interface, except that the storage engine acts as a server and the data invoking interface acts as a client.

Returning to FIG. 2 again, in step 240, the message engine, the data processing engine and the storage engine are containerized, and a real-time data processing architecture is constructed with the containerized message engine, the containerized data processing engine and the containerized storage engine to provide the real-time data service.

In step 241, the message engine, the data processing engine, the storage engine and their dependencies are packaged together as container images respectively by using a container engine, so as to generate a message engine image, a data processing engine image and a storage engine image to achieve containerization of these engines. The containerized message engine, the containerized data processing engine and the containerized storage engine may be assembled as standard units of deployment (i.e., components) so as to construct corresponding real-time data processing architecture. The containerized message engine, data processing engine and storage engine may run on top of a container host to achieve respective functions.

In some embodiments, containerizing the message engine, the data processing engine and the storage engine comprises: setting respective image configuration files for the message engine, the data processing engine and the storage engine, and packaging the message engine, the data processing engine and the storage engine respectively as corresponding container images based on the respective image configuration files, so as to generate a message engine image, a data processing engine image and a storage engine image. In an embodiment in which the storage engine comprises both a column-based database and a relational database, a column-based database image and a relational database image may be generated respectively.

In step 242, a multi-container image configuration file related to the message engine image, the data processing engine image and the storage engine image may be set. The multi-container image configuration file defines image parameters for constructing the real-time data processing architecture, including location relations and connection relations among the message engine, the data processing engine and the storage engine in the real-time data processing architecture. The message engine image, the data processing engine image and the storage engine image may be deployed for real-time data processing mechanisms depending on information (location information, connection information, etc.) provided by the multi-container image configuration file.

In some embodiments, the message engine image, the data processing engine image and the storage engine image may be Kafka image, Flink image and ClickHouse image, respectively.

Optionally, in an embodiment in which the storage engine comprises a relational database such as PostgreSQL and mysql, the storage engine image further comprises a relational database image, e.g., PostgreSQL image and mysql image.

Optionally, when deploying images of the real-time data processing architecture, for a requirement of lightweight deployment, the deployment may not be performed with a cluster of servers, but instead, to be performed with a single server, that is, to deploy the entire real-time data processing architecture in a single server.

In some embodiments, the container engine may construct the real-time data processing architecture by using Docker Compose technology. Docker is an open source application container engine, which is based on the Go language and complies with the open source Apache 2.0 protocol. Docker may be used to package applications and their dependencies into a lightweight and transportable container, which is then published onto a container host, e.g., a Linux machine, to achieve virtualization. Docker Compose is a tool for defining and running a multi-container Docker application program. Through Docker Compose, various services required by the application program may be configured by using a YAML file.

In such an embodiment, the image configuration file may comprise Dockerfile, and the message engine image, the data processing engine image and the storage engine image are generated based on the information and context provided by Dockerfile.

Multiple containers may be defined and run by means of Compose. A multi-container image configuration file in a multi-container environment comprises a YAML format file for defining and running a multi-container application program, e.g., docker-compose.yml. The multi-container image configuration file defines image parameters for constructing the real-time data processing architecture. The image parameters include location relations and connection relations among the message engine, the data processing engine and the storage engine in the real-time data processing architecture.

In some embodiments, the generated message engine image, data processing engine image and storage engine image may be stored in a public cloud warehouse. The multi-container image configuration file docker-compose.yml may also be stored in a public cloud environment. In an example, when a local machine has Docker environment and docker-compose installed thereon, by storing/pulling into the local machine the Docker image of each component (the message engine, the data processing engine and the storage engine) of the real-time data processing architecture and their corresponding image configuration file docker-compose.yml, creating a file or folder with a path on the host as specified in the image configuration file docker-compose.yml, and setting corresponding configuration parameters, the entire application program can be started up and run by running docker-compose up, and this allows to implement the method according to the embodiments of this disclosure and provide real-time data service. The providing the real-time data service comprises providing the target data.

FIG. 6 takes a message engine of Kafka as an example to show the image configuration file corresponding to Kafka. The image configuration file is a text file containing instructions on how to build a Docker image of Kafka. As shown in FIG. 6, the first row of the text file introduces the base image, and then instructions on operations such as installing required programs and copying files etc., until a required working environment is got.

In the image configuration file, "image" represents that the image specified to run on the container is wurstmeister/kafka:2.12-2.1.0 for example; "restart" represents that the restart method is always restart; "ports" represents that the container and the host of the Docker image use port 9092; "environment" represents adding an environment variable, e.g., the title of a topic of Kafka is zhyq-ab-data:3:1; "depends_on" represents that the dependency component of Kafka is zookeeper, which is responsible for resource scheduling and management; "volumns" represents the correspondence relations between folders and files in the Docker image and folders and files in the server; "networks" represents configuring a network connected to the container; "aliases" represents that other containers on the same network may connect to the service of the corresponding container using the service name or the aliases.

Based on the information and context in such an image configuration file, a corresponding Kafka image can be built.

The method for providing real-time data service according to the embodiments of this disclosure can realize an overall architecture with real-time data reception, real-time data processing, real-time data storage, and real-time data service provision, thereby catering to application scenarios having high real-time requirements for data. Moreover, since the real-time data service architecture is constructed through containerized components, it can meet the needs of lightweight and privatized deployment of data collection, storage, and use.

In one embodiment, responsive to the real-time response requirements of the real-time data service, one message engine image, a plurality of data processing engine images and one storage engine image may be deployed for the real-time data processing architecture. Deploying one message engine image can ensure clearance and smoothness of the message channel, and deploying a plurality of data processing engine images at the same time can achieve effective and rapid processing of data.

As a Linux container technology, Docker can deploy multiple versions of Linux in multiple images respectively, so in one embodiment, it is possible to deploy Linux version Centos 7.6 in the data processing engine image of the real-time data processing architecture, and deploy Linux version ubuntu18.04 in the storage engine image. With such flexible deployment, rapid and convenient processing of the data and lightening of the system can be achieved more effectively.

Figure 7:
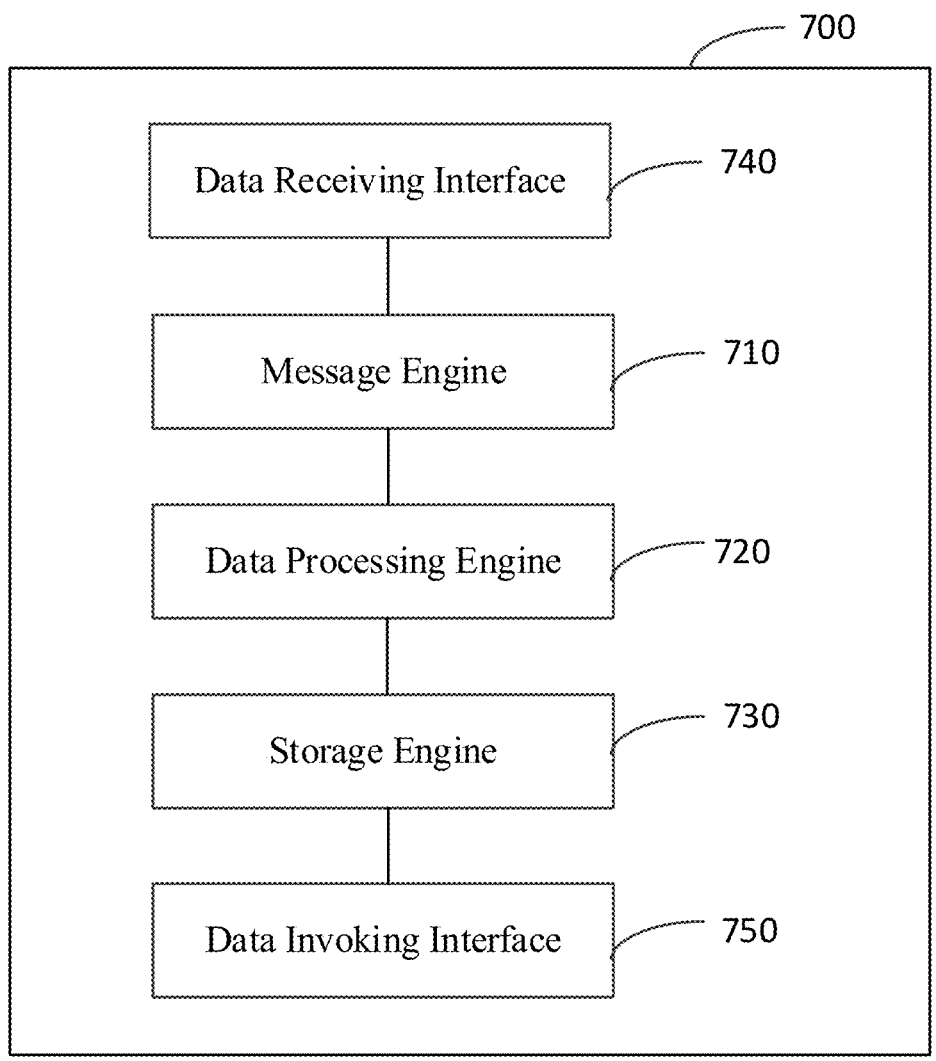
FIG. 7 is a schematic structure view of a device according to an embodiment of this disclosure.

FIG. 7 shows a schematic structure view of a device 700 for providing real-time data service according to an embodiment of this disclosure. The device 700 comprises a message engine 710, a data processing engine 720 and a storage engine 730.

The message engine 710 is configured to receive and store real-time data generated by a real-time data source. In some embodiments, the message engine 710 may receive real-time data via a data receiving interface 740. The data receiving interface may be connected with the real-time data source via a network, so as to collect or receive real-time data generated by the real-time data source. The real-time data may have a standard data format to achieve rapid data storage, thereby satisfying requirements of the real-time data service. The message engine may store the real-time data in a corresponding topic to facilitate subscription by consumers.

The data processing engine 720 is configured to acquire the real-time data in the message engine and process the real-time data to obtain target data. For example, the data processing engine may aggregate the real-time data acquired from one same topic of the message engine. The data processing engine 720 is further configured to store the target data in the storage engine.

The storage engine 730 is configured to store the target data and provide the target data according to requirement of a real-time data service. In some embodiments, the target data may be read from the storage engine via a data invoking interface 750 and transferred to the real-time data service via a network for instance. In some embodiments, the real-time data service may invoke the required target data from the storage engine via a data invoking interface. In some further embodiments, the storage engine may push the target data to the real-time data service according to a preset condition.

In the device 700, the message engine 710, the data processing engine 720 and the storage engine 730 may be containerized via a container engine, and the containerized message engine, data processing engine and storage engine may be used as components for constructing a real-time data processing architecture to provide the real-time data service.

Figure 8:
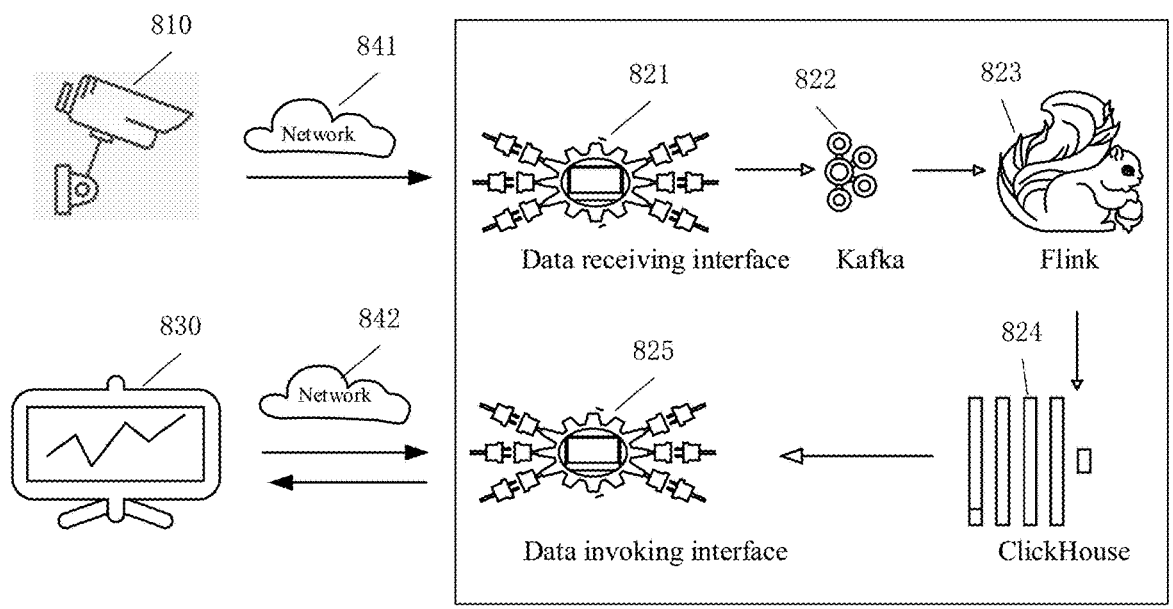
FIG. 8 is a schematic view of using a device according to an embodiment of this disclosure in an application scenario.

FIG. 8 shows a schematic view of using a device according to an embodiment of this disclosure in an application scenario of a smart park. In this application scenario, real-time detection and alarm of foreign objects in and/or intrusion into an electronic fence of the park can be achieved by using a device according to the embodiments of this disclosure. In this example, assuming that a real-time data processing architecture in the device is configured to create a message engine with Kafka, create a data processing engine with Flink and create a storage engine with ClickHouse. It can be understood that the real-time data processing architecture according to the embodiments of this disclosure is not limited thereto, but may adopt any other suitable component.

In the smart park, the electronic fence may be monitored using a camera 810. In some embodiments, multiple cameras 810 may be disposed in multiple areas with electronic fences. Videos shot by the camera may be analyzed by using Artificial Intelligence (AI) algorithm to obtain detection data of a detection result about foreign objects and/or intrusion.

Acting as a real-time data source, the camera 810 pushes real-time data (i.e., detection data) to a data receiving interface 821 for example via a network 841. The data receiving interface 821 transfers the detection data to a specified topic of Kafka 822. The topic may be a topic specially set for the electronic fence of the park. Flink 823 reads the detection data in the topic of Kafka 822 and processes the detection data to obtain target data. Flink 823 stores the processed target data into ClickHouse 824. The data invoking interface 825 reads the target data in ClickHouse 824 and provides it to a real-time service terminal device 830 via a network 842 for instance.

The networks 841 and 842 may take the form of local area network (LAN), wide area network (WAN), wired network, wireless network, personal area network or a combination thereof, and may comprise the Internet.

In this application scenario, the real-time service terminal device 830 may be a large screen with situational awareness. By allowing interacting with a great deal of alarm data and traffic data in real time, real-time data services may be provided via e.g., the large screen with situational awareness. For instance, as soon as the target data indicates the existence of an abnormal result (e.g., a foreign object in and/or intrusion into the electronic fence are detected), the abnormal result will be sent to the large screen for presenting an alarm. Therefore, the large screen with situational awareness can update the abnormal result detected by the AI algorithm in real time.

It can be understood that although the detection data is described above as being transmitted between the components of the real-time data processing architecture in a specific manner, in other embodiments, the detection data may be transmitted in any applicable manner like automatic pull or active push. For example, alternatively, Kafka may also pull the detection data from the data receiving interface.

Figure 9:
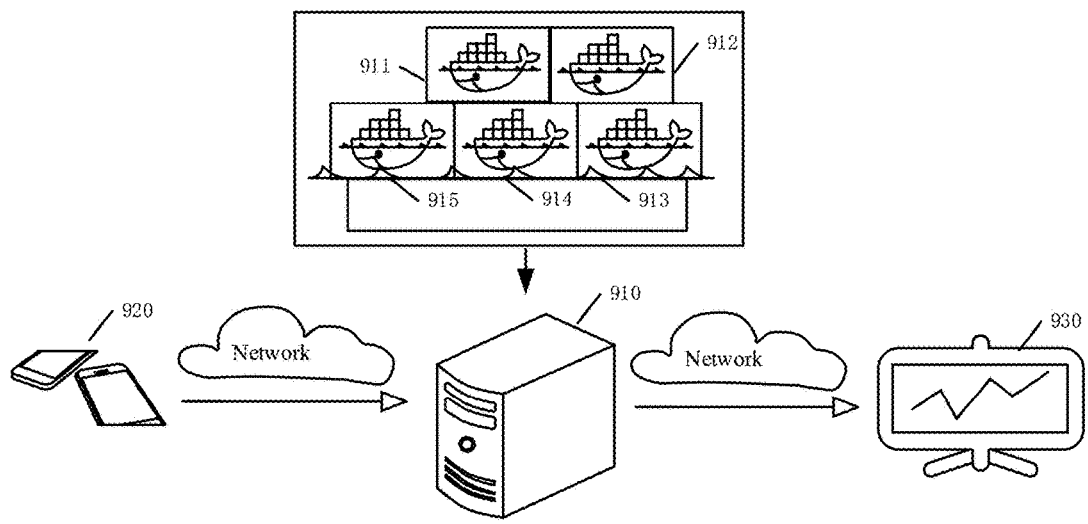
FIG. 9 illustrates an example of a device according to an embodiment of this disclosure.

FIG. 9 illustrates an example of a device 910 for providing real-time data service according to an embodiment of this disclosure. In some embodiments, the device 910 may take the form of a single server. The device 910 comprises a real-time data processing architecture, and components of the real-time data processing architecture are containerized. The containerized components comprise a data receiving interface image 911, a message engine image 912 (e.g., Kafka), a data processing engine image 913 (e.g., Flink), a storage engine image 914 (e.g., ClickHouse) and a data invoking interface image 915, etc.

The device 910 receives real-time data from a real-time signal source 920, and performs operations of storage, processing, etc. on the real-time data by using a real-time data processing architecture to obtain and store target data. The device 910 also provides target data to a real-time service terminal device 930 according to requirement of a real-time data service.

It can be understood that although FIG. 9 only shows one image for each component in the real-time data processing architecture, in other embodiments, different numbers of message engine images, data processing engine images and storage engine images may be deployed for the real-time data processing architecture depending on the application scenario or in light of the characteristics of the real-time data service. Exemplarily, responsive to the real-time response requirements of the real-time data service, one Kafka image may be deployed for the message engine; multiple Flink images may be deployed for the data processing engine; and one ClickHouse image may be deployed for the storage engine. Optionally, each Kafka image may correspond to multiple topics, and each Flink image is configured to acquire real-time data of a corresponding topic.

When used herein, the terms "component", "engine", "system" and/or "interface" are generally intended to refer to computer-related entities, either hardware, software, a combination of hardware and software, or software in execution. For example, the component or the engine may be, but is not limited to, a process run on a processor, a processor, an object, an executable file, a thread of execution, a program, and/or a computer. For example, both a controller and an application run on the controller may be a component or an engine. One or more components or engines may reside in processes and/or threads of execution, and the components or engines may be limited to one computer and/or distributed between two or more computers.

Figure 10:
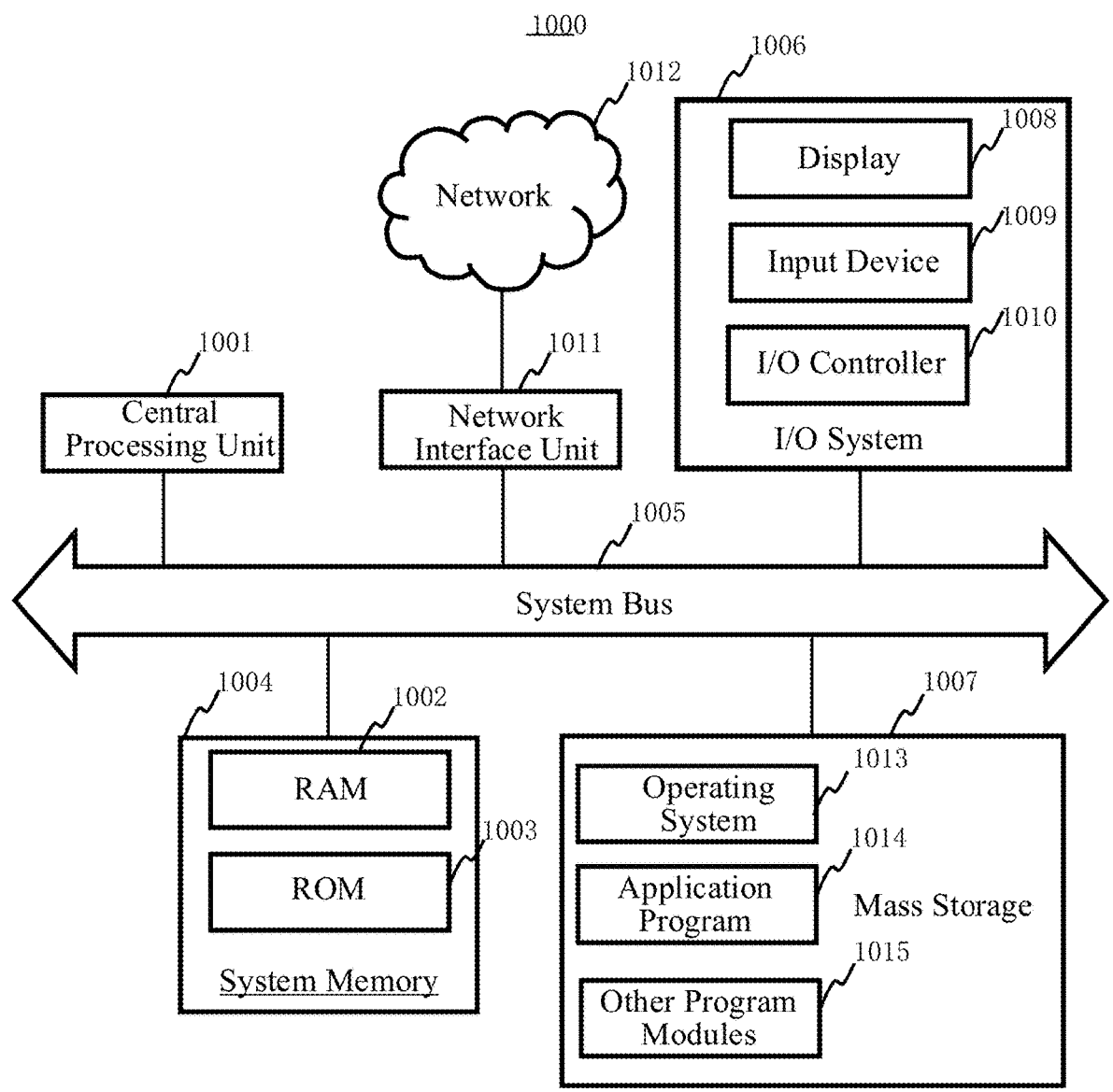
FIG. 10 illustrates the architecture of a computing device according to an embodiment of this disclosure.

Referring to FIG. 10, architecture of a computing device according to an embodiment of this disclosure is shown. The computing device represents one or more computing systems and/or devices capable of implementing various techniques described herein. The device according to the embodiments of this disclosure can be implemented by the computing device.

The computing device 1000 comprises a central processing unit (CPU) 1001, a system memory 1004 including a random access memory (RAM) 1002 and a read only memory (ROM) 1003, and a system bus 1005 connecting the system memory 1004 and the central processing unit 1001. The computing device 1000 also comprises a basic input/output system (I/O system) 1006 that facilitates information transfer between components within the computer, and a mass storage 1007 for storing an operating system 1013, an application program 1014, and other program modules 1015.

The basic input/output system 1006 comprises a display 1008 for displaying information and an input device 1009 such as a mouse and a keyboard for inputting information by the user. The display 1008 and the input device 1009 are both connected to the central processing unit 1001 via an input and output controller (I/O controller) 1010 connected to the system bus 1005. The basic input/output system 1006 may also comprise an input and output controller 1010 for receiving and processing input from other devices such as a keyboard, a mouse, or an electronic stylus. Similarly, the input and output controller 1010 also provides output to a display screen, a printer, or other types of output devices.

The mass storage 1007 is connected to the central processing unit 1001 via a mass storage controller (not shown) connected to the system bus 1005. The mass storage 1007 and its associated computer-readable medium provide nonvolatile storage for the computing device 1000. In other words, the mass storage 1007 may include a computer-readable medium (not shown) such as a hard disk or a CD-ROM drive.

Without loss of generality, the computer-readable medium may comprise a computer storage medium and a communication medium. The computer storage medium comprises volatile and nonvolatile, removable and non-removable media implemented by any method or technology for storing information such as computer-readable instructions, data structures, program modules or other data. The computer storage medium comprises RAM, ROM, EPROM, EEPROM, flash memory or other solid-state storage technologies, CD-ROM, DVD or other optical storage, cassette, magnetic tape, disk storage or other magnetic storages. Of course, those skilled in the art know that the computer storage medium is not limited thereto. The system memory 1004 and the mass storage 1007 may be collectively referred to as a memory.

The memory stores one or more programs configured to be executed by one or more central processing units 1001 and containing instructions for implementing the method for providing real-time data service according to the embodiments of this disclosure, and the central processing unit 1001 executes the one or more programs to implement the method for providing real-time data service provided in the above method embodiments.

According various embodiments of this disclosure, the computing device 1000 may be further connected via a network such as Internet to a remote computer on the network and run thereon. That is, the computing device 1000 may be connected to a network 1012 via a network interface unit 1011 connected to the system bus 1005, or in other words, be connected to other types of networks or remote computer systems (not shown) by using the network interface unit 1011.

The memory further comprises one or more programs stored in the memory and containing steps in the method for providing real-time data service according to the embodiments of this disclosure.

The embodiments of this disclosure further provide a non-transitory computer-readable storage medium. The computer-readable storage medium has a computer program stored thereon, and the computer program, when executed by a processor, causes the processor to implement steps of the method for providing real-time data service according to the embodiments of this disclosure.

The technical solutions provided in the embodiments of this disclosure have at least the following technical effects or advantages:

The method for providing real-time data service according to the embodiments of this disclosure can realize an overall architecture of real-time data reception, real-time data processing, real-time data storage, and real-time data service support, thereby catering to application scenarios having high real-time requirements for data and meeting the needs of lightweight and privatized deployment of data collection, storage, and use.

The method for providing real-time data service according to the embodiments of this disclosure can realize the above overall architecture by means of image such that the overall architecture is transplantable. After being realized, the architecture may also be directly transplanted to other machines, which is convenient for use.

Those skilled in the art should understand that the embodiments of this disclosure may be realized as a method, system or computer program product. Therefore, this disclosure may take the form of an entirely hardware embodiment, an entirely software embodiment or an embodiment combining hardware and software elements. Moreover, this disclosure may take the form of a computer program product implemented on one or more computer-usable storage media (including but not limited to disk storage, CD-ROM, optical storage, etc.) containing computer-usable program codes.

The embodiments of this disclosure are described with reference to the flow charts and/or block diagrams of methods, devices (modules, systems), and computer program products. It should be understood that each process and/or block in the flow charts and/or block diagrams, and a combination of multiple processes and/or blocks in the flow charts and/or block diagrams may be implemented by computer program instructions. These computer program instructions may be provided to a processor of a general-purpose computer, a special-purpose computer, an embedded computer, or other programmable data processing equipment to produce a machine, such that the instructions executed by the processor of the computer or other programmable data processing equipment produces a device for realizing functions specified in one or more processes of the flow charts and/or one or more blocks of the block diagrams.

These computer program instructions may also be stored in a computer-readable memory capable of directing a computer or other programmable data processing equipment to work in a specific manner, such that the instructions stored in the computer-readable memory produce a product containing an instruction device realizing functions specified in one or more processes of the flow charts and/or one or more blocks of the block diagrams.

These computer program instructions may also be loaded on a computer or other programmable data processing equipment to carry out a series of operating steps on the computer or other programmable equipment to produce computer-implemented processing, such that the instructions executed on the computer or other programmable equipment provide steps specified in one or more processes of the flow charts and/or one or more blocks of the block diagrams.

Although this disclosure has been described in combination with exemplary embodiments, those skilled in the art will understand that many modifications can be made to these embodiments within the scope of the appended claims. Correspondingly, the above description is not intended to limit the scope of this disclosure in any way. In contrast, the scope of this disclosure will be determined with reference to the claims.

The invention claimed is:

1. A method for providing real-time data service, comprising:
creating a message engine for receiving real-time data generated by a real-time data source and storing the real-time data;
creating a data processing engine for acquiring the real-time data in the message engine and processing the real-time data to obtain target data;
creating a storage engine for storing the target data and providing the target data according to requirement of a real-time data service; and
containerizing the message engine, the data processing engine and the storage engine, and constructing a real-time data processing architecture with a containerized message engine, a containerized data processing engine and a containerized storage engine to provide the real-time data service;
wherein the containerizing the message engine, the data processing engine and the storage engine comprises:
setting respective image configuration files for the message engine, the data processing engine and the storage engine; and
packaging the message engine, the data processing engine and the storage engine respectively into corresponding container images based on the respective image configuration files, so as to generate a message engine image, a data processing engine image and a storage engine image, and
wherein the constructing the real-time data processing architecture with the containerized message engine, the containerized data processing engine and the containerized storage engine comprises:
setting a multi-container image configuration file related to the message engine image, the data processing engine image and the storage engine image, wherein the multi-container image configuration file defines image parameters for constructing the real-time data processing architecture, and the image parameters comprising location relations and connection relations of the message engine, the data processing engine and the storage engine.

2. The method according to claim 1,
wherein the receiving real-time data generated by the real-time data source comprises receiving real-time data collected via a data receiving interface, and the storage engine comprises a column-based database and a relational database, and
wherein the method further comprises packaging the data receiving interface into a corresponding container image to generate a data receiving interface image, and the storage engine image comprises a column-based database image and a relational database image.

3. The method according to claim 1, wherein the constructing the real-time data processing architecture with the containerized message engine, the containerized data processing engine and the containerized storage engine comprises:
deploying a message engine image, a plurality of data processing engine images and a storage engine image for the real-time data processing architecture in response to a real-time response requirement of the real-time data service.

4. The method according to claim 1, wherein the real-time data has a standard data format, the standard data format including data type and data content.

5. The method according to claim 4, wherein the message engine comprises multiple topics for classifying messages conveyed by the real-time data, and the receiving real-time data generated by the real-time data source comprises:
classifying the received real-time data having a same standard data format into a same topic of the message engine.

6. The method according to claim 1, wherein the acquiring the real-time data in the message engine and processing the real-time data to obtain target data comprises at least one of:
deleting real-time data not meeting a preset condition;
converting real-time data in nested format into real-time data in one dimension format;
cleaning the real-time data; or
integrating the real-time data.

7. The method according to claim 1,
wherein the storing the target data comprises creating for the storage engine a database table meeting a preset condition, and transferring the target data in real time to and storing in the database table,
wherein the providing the target data according to requirement of the real-time data service comprises processing structured target data in the database table according to the requirement of the real-time data service and providing the processed target data, and
wherein the processing comprises at least one of aggregation and filtering.

8. A computing device, comprising:
a memory for storing a computer program; and
a processor for executing the computer program to implement the method according to claim 1.

9. The computing device according to claim 8,
wherein the receiving real-time data generated by the real-time data source comprises receiving real-time data collected via a data receiving interface, and the storage engine comprises a column-based database and a relational database; and
wherein the method further comprises packaging the data receiving interface into a corresponding container image to generate a data receiving interface image, and the storage engine image comprises a column-based database image and a relational database image.

10. The computing device according to claim 8, wherein the constructing the real-time data processing architecture with the containerized message engine, the containerized data processing engine and the containerized storage engine comprises:
deploying a message engine image, a plurality of data processing engine images and a storage engine image for the real-time data processing architecture in response to a real-time response requirement of the real-time data service.

11. The computing device according to claim 8, wherein the real-time data has a standard data format, the standard data format including data type and data content.

12. The computing device according to claim 11, wherein the message engine comprises multiple topics for classifying messages conveyed by the real-time data, and the receiving real-time data generated by the real-time data source comprises:
classifying the received real-time data having a same standard data format into a same topic of the message engine.

13. The computing device according to claim 8, wherein the acquiring the real-time data in the message engine and processing the real-time data to obtain target data comprises at least one of:
deleting real-time data not meeting a preset condition;
converting real-time data in nested format into real-time data in one dimension format;
cleaning the real-time data; or
integrating the real-time data.

14. The computing device according to claim 8,
wherein the storing the target data comprises creating for the storage engine a database table meeting a preset condition, and transferring the target data in real time to and storing in the database table,
wherein providing the target data according to requirement of the real-time data service comprises processing structured target data in the database table according to the requirement of a real-time data service, and providing the processed target data, and
wherein the processing comprises at least one of aggregation and filtering.

15. A device implemented by a computer for providing real-time data service, the device comprising a container host configured to run:
a message engine configured to receive real-time data generated by a real-time data source and store the real-time data;
a data processing engine configured to acquire real-time data in the message engine and process the real-time data to obtain target data; and
a storage engine configured to store the target data and provide the target data according to requirement of a real-time data service,
wherein the message engine, the data processing engine and the storage engine are containerized, and the containerized message engine, data processing engine and storage engine are used as components for constructing a real-time data processing architecture to provide the real-time data service;
wherein respective image configuration files are set for the message engine, the data processing engine and the storage engine and the message engine, the data processing engine and the storage engine are packaged respectively into corresponding container images based on the respective image configuration files, so as to generate a message engine image, a data processing engine image and a storage engine image, and
wherein a multi-container image configuration file related to the message engine image, the data processing engine image and the storage engine image is set, and the multi-container image configuration file defines image parameters for constructing the real-time data processing architecture, and the image parameters comprising location relations and connection relations of the message engine, the data processing engine and the storage engine.

16. A non-transitory computer-readable storage medium, having a computer program stored thereon, wherein the computer program, when executed by a processor, causes the processor to implement operations of the method according to claim 1.

* * * * *